United States Patent [19]
D'Albora

[11] 4,114,136
[45] Sep. 12, 1978

[54] DETERMINATION OF VARIATIONS OF WAVE CHARACTERISTICS

[75] Inventor: John M. D'Albora, Tiverton, R.I.

[73] Assignee: The United States of America as represented by the Secretary of the Navy, Washington, D.C.

[21] Appl. No.: 446,571

[22] Filed: Feb. 25, 1975

[51] Int. Cl.² ............................................... G01S 9/66
[52] U.S. Cl. ................................. 340/3 R; 73/170 A; 343/5 W
[58] Field of Search ...................... 340/3 R, 3 D, 5 R; 343/5 W; 73/170 R, 170 A, 554

[56] References Cited

U.S. PATENT DOCUMENTS 3,540,829 11/1970 Collinson et al. .................. 343/5 W
3,735,333 5/1973 Balser et al. ......................... 340/3 D

*Primary Examiner*—Richard A. Farley
*Attorney, Agent, or Firm*—Richard S. Sciascia; Arthur A. McGill; Prithvi C. Lall

[57] ABSTRACT

A processor for a quick measurement of statistically significant variations of the characteristics of a signal in the presence of noise wherein the processor measures the variance of a wave parameter such as the time period of the signal. The processor also measures the signal-to-noise ratio from which the variance of the time period of the signal is calculated. A comparison of the measured and the calculated values of the variance of the time period thus gives information about the small variations in the characteristics of the signal.

10 Claims, 1 Drawing Figure

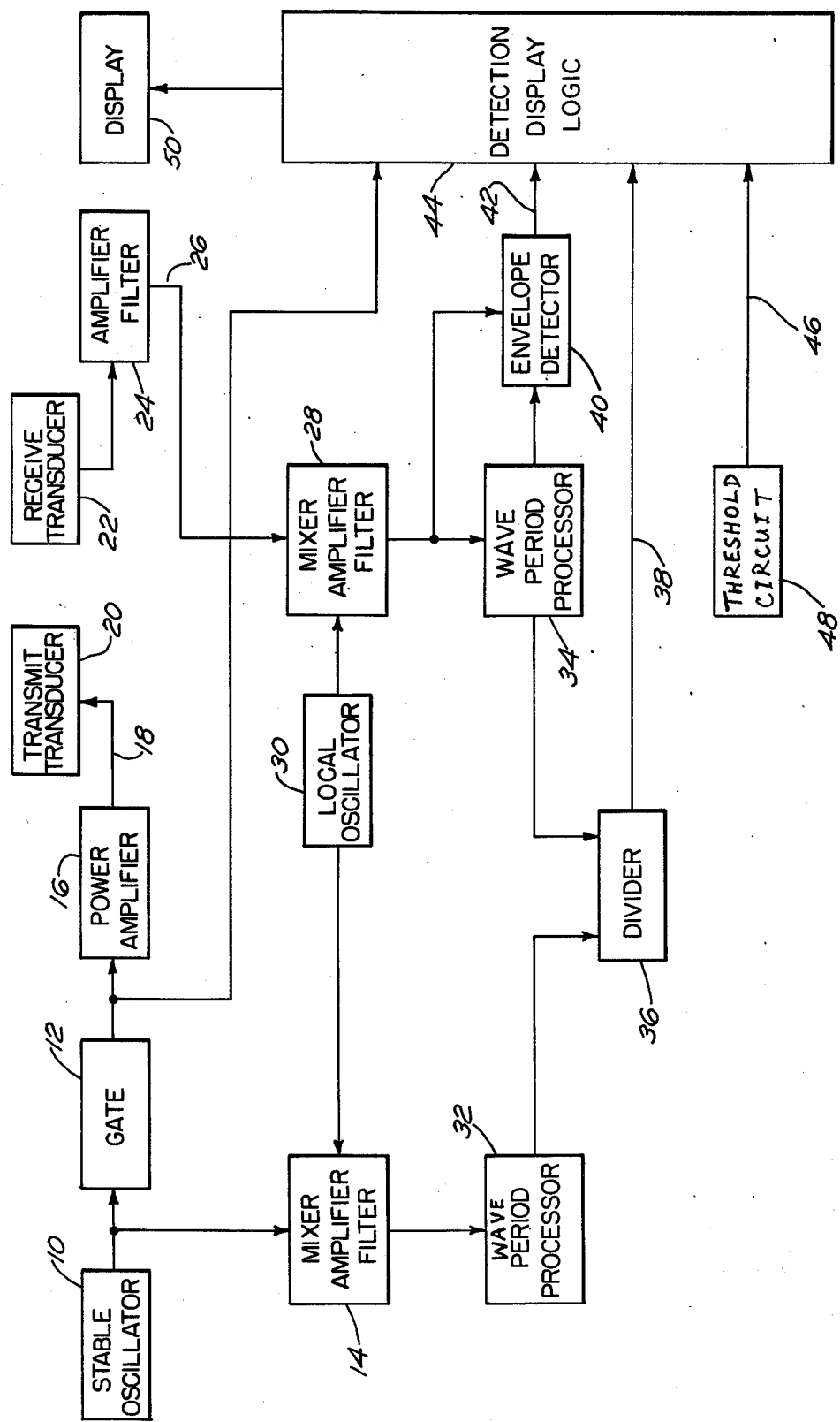

DETERMINATION OF VARIATIONS OF WAVE CHARACTERISTICS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a quick measurement of statistically significant variations of the characteristics of a signal in the presence of noise and more specifically to ascertaining turbulent condition in a body of water from the quick measurements of statistically significant variations in the characteristics of a signal in the presence of noise.

The general technique of using Doppler spreading to detect atmospheric turbulence has been used with weather radar for quite some time. As discussed by Roger M. Lhermitty in Radio Science, Vol. 4, No. 12, pp. 1241–1246 (December 1969), the method used for that purpose utilizes the variance of the Doppler radar observed spectrum of velocity of man-made targets used as tracers for the turbulent air motion. However, no attempt has been made to use a similar method to ascertain turbulent conditions in a body of water.

SUMMARY OF THE INVENTION

The objects and advantages of the present invention are accomplished by utilizing a processor wherein a constant frequency signal from a stable oscillator is transmitted in the body of water by a projector, i.e., a transmit transducer. The transmitted signal is received by a hydrophone, i.e., a receive transducer, which has an amplitude and frequency variations caused by volume reverberation in the body of water. The time periods of the transmitted signal and the received signal are measured by wave period processors and are compared in a divider circuit. The amplitude of the received signal is also determined as a function of time by using an envelope detector. Any statistically significant variations in the output of the divider circuit which compares the time periods of the transmitted signal and the received signal measures the variations in the time period of the received signal from which the variance of the time period of the received signal is determined. The variance of the time period is defined as the sum of the squares of the differences between each of the time periods measured and the mean of all the time period measurements divided by i n−1 where $n$ is the number of the samples of the time period. The variations in the amplitude of the received signal as a function of time determines signal-to-noise ratio, hereinafter referred to as $r$ or $S/N$, of the received signal. From the measured value of $S/N$ of the received signal, the variance of the time period of the received signal is calculated. Any statistically significant difference between the measured variance of the time period and the calculated value of the variance of the time period of the received signal measures the extent of turbulent conditions in the body of water.

An object of this invention is to have a processor for quick measurements of small variations of the characteristics of an acoustic wave in the presence of noise in a body of water.

Another object of this invention is to use a processor for determining quick variations in the time period of an acoustic wave in the presence of noise in a body of water.

Still another object of this invention is to use a processor for ascertaining the extent of turbulent conditions in a body of water using an acoustic signal.

Other objects, advantages and novel features of the invention will become apparent from the following detailed description of the invention when considered in conjunction with the accompanying drawing, the single FIGURE of which illustrates a signal processor for quick determination of the small variations in the time period of an acoustic signal, the processor being constructed in accordance with the teachings of the present invention.

DESCRIPTION OF A PREFERRED EMBODIMENT

A preferred embodiment of a processor is shown in the attached FIGURE wherein block 10 represents a stable oscillator which generates an electrical signal, preferably a sinusoid signal having a constant high frequency. The stable oscillator used in the preferred embodiment was Hewlett-Packard Model 204D. However, it should be noted that any other similar stable oscillator can be used without deviating from the spirit of subject invention. The sinusoid signal of high frequency generated by stable oscillator 10 is gated by a gating circuit 12 which has a high on-to-off ratio. One such gating circuit is provided by General Radio Type 1396A modified to have a higher on-to-off ratio. The output of stable oscillator 10 is also fed to circuit 14 which includes a mixer, an amplifier and a filter. The gated output of stable oscillator 10, gated by circuit 12, is amplified by a power amplifier 16 and is also used as a time reference signal for time measurements during the operation of the processor. The output 18 of power amplifier 16 is used to drive a projector 20, i.e., a transmit transducer, which transmits an acoustic signal in a body of water which contains objects of various sizes of particulate matter including air bubbles which act as scatterers or targets for the transmitted acoustic signal. The scattered signal having magnitude and frequency dependent on the volume reverberation by the targets or scatterers in the body of water is received by hydrophone 22, i.e., a receive transducer. It should be noted that projector 20 and hydrophone 22 can also be combined into a single transducer through the use of a duplexer which allows the transducer to act as a projector a portion of the time and act as a hydrophone during the remaining portion of the time. The output of transducer 22 is amplified and filtered in an amplifying and filtering circuit 24 such as a circuit made by either Ithaco Corporation or Princeton Applied Research Corporation. The output 26 of circuit 24 is then fed into a mixing, amplifying, and filtering circuit 28. A local oscillator 30 mixes its output with the output of stable oscillator 10 in mixing, amplifying and filtering circuit 14 and with the output 26 of circuit 24 in mixing, amplifying and filtering circuit 28; thus heterodyning the outputs of stable oscillator 10 and circuit 24. The output of circuit 14 is fed into a wave period processor 32 which measures the time interval between zero crossings of the output signal of circuit 14 and thus determines the time period of the signal generated by stable oscillator 10. The output of circuit 28 is processed by another wave period processor 34 which is similar in characteristics to the wave period processor 32. The wave period processors 32 and 34 may consist of a zero crossing detector (either upward or downward going zero crossing) which triggers a counter on and off at successive zero crossings, or after $n$ zero crossings. The output of wave period processor 32 is then proportional to the time period of the output signal of the stable oscillator 10, i.e., time period of the transmitted signal, and the output of the wave period processor 34 is proportional to the time period of the received signal, i.e., the output of transducer 22 which is the received signal. The outputs of wave period processors 32 and 34 are divided in a divider circuit 36 so as to give an output 38 which is proportional to the quotient of the outputs of wave period processors 32 and 34. The output of circuit 28 is also fed to an envelope detector circuit 40. Since the output of circuit 28 is a continuous wave (c.w.), it is gated by the output of wave period processor 34 in order to measure amplitude of the received signal for which the time period of the received signal is compared with the time period of the output of the stable oscillator 10. The output of the envelope detector circuit 40 contains both signal and noise information. The noise information from output 42 is obtained by sampling output 42 long after the sonar ping, when reverberation has ceased, leaving only the noise portion. The signal plus noise information is obtained by sampling output 42 immediately after the sonar ping until volume reverberation ceases. As pointed out earlier, this is accomplished by using a time signal which is the output of the gating circuit 12 and is accomplished in a detection/display logic circuit 44 which also displays the time period variation information which is contained in output 38 of divider circuit 36. The threshold of circuit 44 is set by a signal 46 from circuit 48. The threshold signal 46 is chosen to eliminate information coming from the motion of either the projector 20 or the hydrophone 22. The output 38 as displayed and synchronized on a display unit 50 measures the time period variations of the received signal. The output 42 of envelope detector circuit 40 synchronized by detection/display logic circuit 44 is also displayed on a display unit 50. Output 38 measures small variations in the time period of the received acoustic signal and the sampling of output 42 of envelope detector as a function of time measures the signal-to-noise ratio, $S/N = r$, of the received signal for which time period variations have been determined. From the measured value of $r = S/N$ of the received volume reverberated acoustic signal, the variance of the time period of the received volume reverberated signal is calculated. Methods of calculating the time period of an acoustic signal from the measured values of $r = S/N$ are well known to a person having ordinary skill in the art. One such method is explained by A. A. Gerlach in Theory and Applications of Statistical Wave-Period Processing (1967), Vol. 1, Sec. 7.4, pp 7-31 through 7-40. A graph is plotted between probability density function, $p$, of the time period, $x$, of the wave for different values of $r = S/N$. From the graph of $p$ vs. $x$, one can calculate, the variance, $\sigma^2$, of time period, $x$, for measured values of $r = S/N$ where $\sigma^2$, the variance of the time period, $x$, is given by:

$$\sigma^2 = \int_o^\infty x^2 \, pdx.$$

Having calculated the value of the variance, $\sigma^2$, of the time period, $x$, for different values of $r = S/N$, another graph between the variance of the time period and $S/N$ is plotted, from which the variance of the time period of the signal is read off for different measured values of $r = S/N$ of the received reverberated signal. Any statistically significant difference between the measured and the calculated variance of the time period of the received volume reverberated acoustic signal thus is displayed on display circuit 15 as quotient of the measured and calculated value of the time period of the received volume reverberated signal. However, this calculation is made in detection/display logic circuit 44 which is an ordinary computer which is programmed to find the quotient of the output 38, which gives the variance of the measured values of the time periods of the received volume reverberated signal; and a quantity dependent upon output 42, from which the variance of the time period of the received volume reverberated signal is calculated by circuit 44 from the measured $S/N$ ratio of the received reverberated signal. The output of circuit 44 the is quotient of the variance of the measured value of the time period and the variance of the calculated time period of the volume reverberated signal from the measured value of $S/N$ ratio thereof. Any statistically significant difference between the variances of the measured and calculated values of the time periods of the received volume reverberated signal, the amount of turbulence, i.e., $u$, the velocity of turbulence, of the fluid, which in this case is the body of water, is determined. This is accomplished by the fact that the time period, $x$, of a wave is related to the frequency thereof as $f = 1/x$. Furthermore, the difference $\Delta f$, between the frequency, $f_T$, of the transmitted signal and the frequency, $f_R$, of the received signal is related to $u$, the velocity of turbulence of the fluid, and $C$, the speed of sound in the fluid which is practically constant, is related as:

$$\Delta f = f_T - f_R = \frac{2u}{C} f_T$$

Since $C$ and $f_T$ are constants, one can find the value of $u$, the velocity of turbulence, i.e., the amount of turbulence in the fluid, from $\Delta f$ which can be found from $\Delta x$ determined by the processor as described above by measurements made on the output of circuit 44 as displayed on display circuit 50.

It should be noted that all circuits used in the processor are conventional electronic units and can be bought as off-the-shelf items from various manufacturers as long as the various units are properly interfaced.

Briefly stated, in a processor, for a quick measurement of small variations of the characteristics of an acoustic signal in a body of water in the presence of noise, built according to the teachings of subject invention, a constant frequency signal is transmitted in the body of water using a projector, i.e., a transmit transducer. The reverberated signal resulting from the scattering of the transmitted signal by scatterers is received by a hydrophone, i.e., a receive transducer. The time periods of the transmitted signals and the received volume reverberated signal are measured by a pair of wave period processors and are compared in a divider circuit to find variance of the time period of the received signal as compared to the constant time period of the transmitted signal. The amplitude of the received volume reverberated signal is also determined as a function of time in order to obtain $r = S/N$ by using an envelope detector.

From the measured value of $r = S/N$, variance of the time period is calculated. Any statistically significant difference between the measured variance of the time period of the received volume reverberated signal and the calculated value thereof from the measured value of $r = S/N$ gives the extent of turbulent conditions in the body of water.

Obviously many modifications and variations of the present invention are possible in the light of the above teachings. As an example, a single transducer can be used as a projector and hydrophone by using a duplexer. Furthermore, the conventional circuits such as stable oscillator; gating circuit; power amplifiers; mixing, amplifying and filtering circuits; wave period processors; envelope detector; dividers; detection/display logic circuit can be chosen irrespective of any particular manufacturer as long as the conventional circuits interface with one another. Besides, an optical source such as a laser can also be used instead of an acoustic signal source for determining turbulent conditions in a body of water. An electromagnetic source can also be used when the medium under consideration for finding turbulent conditions thereof is air. It is therefore understood that within the scope of the appended claims the invention may be practiced otherwise than as specifically described.

I claim:

1. A processor for measurement of statistically significant variations of the time period of a volume reverberated signals in the presence of noise in a fluid, comprising:

a first oscillator for generating signals of relatively high frequency;

a gating means for gating the output of said first oscillator;

a first amplifying means for amplifying the gated output of said first oscillator;

a transmit transducer for transmitting the output of said first amplifying means as transmitted signals for volume reverberation in said fluid;

a receive transducer for receiving said transmitted signals after being volume reverberated in said fluid;

an amplifying and filtering means for amplifying and filtering the output of said receive transducer;

a second oscillator for generating signals of slightly lower frequency than the frequency of the output of said first oscillator;

a first mixing, amplifying and filtering means for heterodyning the outputs of said first oscillator and said second oscillator;

a second mixing, amplifying and filtering means for heterodyning the outputs of said amplifying and filtering means and said second oscillator;

a first wave period processor for measuring the time period of the output of said first mixing, amplifying and filtering means and thus the time period of the output signals of said first oscillator;

a second wave period processor for measuring the time period of the output of said second mixing, amplifying and filtering means and thus the time period of the received signals;

a dividing means for comparing the outputs of said first and second time period processors;

an envelope detector for measuring the amplitude of the received volume reverberated signals, said envelope detector producing an output upon coincidence of the output of second mixing, amplifying and filtering means and the output of second wave period processor, thus measuring the amplitude and the time period of the same received volume reverberated signal;

a detection display logic means for sorting out the outputs of said envelope detector and said dividing means while the gated output of said first oscillator providing time base reference for said detection display logic means; and a display means for displaying the time period variation information and amplitude variation information of said received volume reverberated signals.

2. The processor of claim 1 wherein said transmitted and received signals are acoustic signals.

3. The processor of claim 2 wherein said fluid is a body of water.

4. The processor of claim 2 wherein said fluid is air.

5. The processor of claim 1 wherein said transmitted and received signals are optical signals.

6. The processor of claim 5 wherein said fluid is a body of water.

7. The processor of claim 5 wherein said fluid is air.

8. The processor of claim 1 wherein said transmitted and received signals are electromagnetic waves.

9. A method for determining statistically significant time period variations of a received volume reverberated acoustic signal in a body of water comprising the steps of:

transmitting an acoustic signal of a stable frequency;

receiving said transmitted signal after being volume reverberated in said body of water;

measuring time periods of said transmitted and said received acoustic signals;

comparing the time periods of said transmitted and received signals;

measuring the amplitude of said received volume reverberated acoustic signal as a function of time, thus measuring signal-to-noise ratio thereof;

calculating time period variations of said received volume reverberated acoustic signal from the measured signal-to-noise ratio thereof; and comparing the measured time period variations with the calculated time period variations of said received volume reverberated acoustic signal.

10. The method of claim 9 for determining statistically significant time period variations of a received volume reverberated acoustic signal wherein said step of measuring time periods of said transmitted and said received acoustic signals further comprises the step of heterodyning said transmitted and said received signals by signals of frequency slightly lower than said stable frequency acoustic signal.

* * * * *